United States Patent [19]
Elliott

[11] 3,966,166
[45] June 29, 1976

[54] SCULPTURE MOLD

[75] Inventor: James B. Elliott, Hacienda Heights, Calif.

[73] Assignee: Poly-Optics, Inc., Santa Ana, Calif.

[22] Filed: Dec. 26, 1974

[21] Appl. No.: 536,518

[52] U.S. Cl. .............................. 249/134; 249/55; 249/105; 249/165
[51] Int. Cl.² .......................................... B29C 1/16
[58] Field of Search .................... 425/DIG. 57, 803; 249/55, 134, 140, 165, 105; 264/220, 237

[56] References Cited
UNITED STATES PATENTS

| | | | |
|---|---|---|---|
| 3,219,307 | 11/1965 | Leeds et al. | 249/140 X |
| 3,309,738 | 3/1967 | Friedman | 249/164 |
| 3,332,658 | 7/1967 | Lemelson | 249/140 X |
| 3,856,257 | 12/1974 | Wetstone | 249/140 X |

Primary Examiner—Robert D. Baldwin
Attorney, Agent, or Firm—Nilsson, Robbins, Dalgarn & Berliner

[57] ABSTRACT

Mold halves are formed from thin, flexibly stiff, rigid polyvinyl chloride film having a thickness of 0.010 ± 0.003 inch and which is deformed to conform to opposite surface contours of a structure to be produced. The mold halves mate along a parting line to define a mold chamber in the shape of the desired structure and are formed with an access opening to the chamber, marginal regions coextensive about the chamber from the parting line, and conjugate protuberances on the marginal regions. The film is thin and pliable enough for pins to be inserted cross-wise through the protuberances to secure together the mold halves, yet thick and rigid enough to support casting material poured therein and flexible enough to be peeled from the partially set product.

1 Claim, 10 Drawing Figures

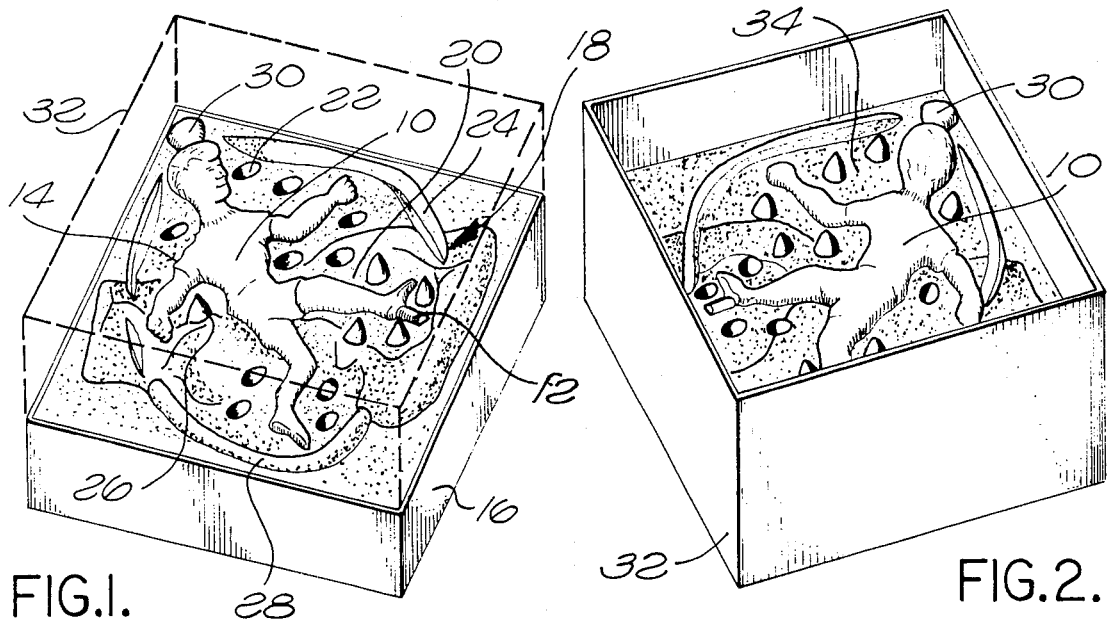
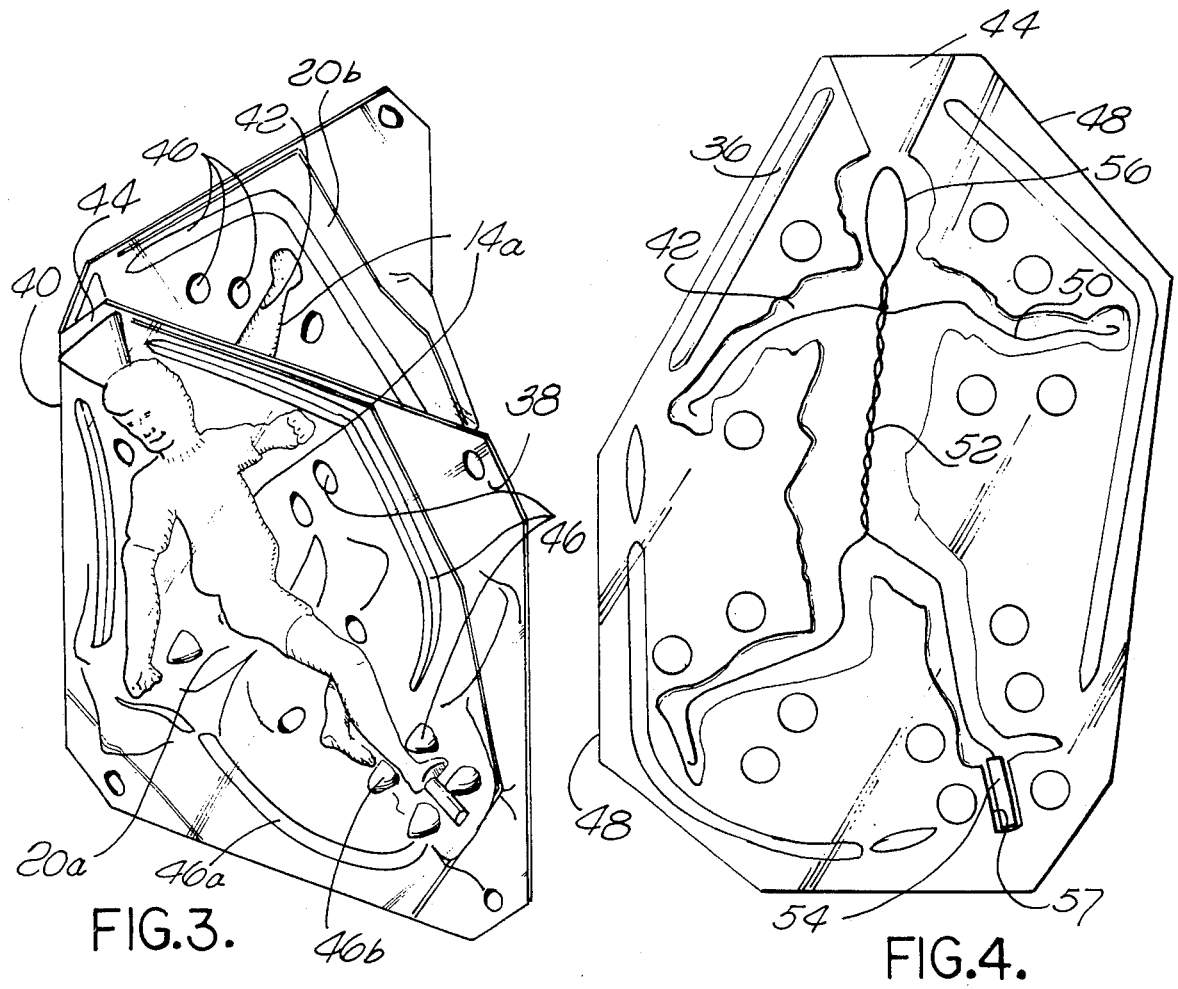

SCULPTURE MOLD

FIELD OF THE INVENTION

The fields of art to which the invention pertains include the fields of molds and casting processes and apparatus.

BACKGROUND AND SUMMARY OF THE INVENTION

It has become a popular pasttime to produce various objects d'art by means of hobby craft kits, such as paint-by-number kits, jewelry-making kits, and the like. Such kits generally provide for a series of basic steps, each step being performable by a person of average ability, the successful execution thereof resulting in the production of an object purportedly having artistic merit. Kits for the production of sculpture arts have been available but have generally suffered from one or more drawbacks such as high cost, poor quality results, limited nature of figures producable by the method, difficulty in execution, high incidence of breakage, lack of capability to permit individual artistic expression and lack of artistic and decorative value of the product.

The present invention provides an inexpensive implement for enabling a person of ordinary skill to readily produce sculpture art of a virtually unlimited variety and of high artistic and decorative value. The implement enables the user to be guided throughout all steps, yet he or she retains a feeling of accomplishment and can express a high degree of individuality, if desired. The foregoing is accomplished by providing as the aforementioned implement a uniquely constructed mold for cast-reproduction of a decorative structure. The mold comprises a pair of mold halves, each formed of rigid polyvinyl chloride film having a thickness of 0.010 ±0.003 inch and which is deformed to conform to opposite surface contours of a structure to be produced. The mold halves mate along a parting line to define a mold chamber, an access opening to the chamber and marginal regions coextensive about the chamber from the parting line. The marginal regions are formed with conjugate protuberances which coact to align the mold halves and which can be secured by cross-wise insertion of pins therethrough. Accordingly, a mold is provided which can be securely closed without the need for expensive and bulky framing structures.

While different materials and different thicknesses may be usable to form molds for some types of figures, I have discovered that properties needed to facilitate securement of the aforenoted conjugal marginal protuberances, and for foolproof use by amateurs for the widest figure shapes, are uniquely provided by rigid polyvinyl chloride (as will be described in the details hereinafter provided) of the aforenoted thickness. Such properties are sufficient thinness for ease of penetration of pins therethrough, the ability to be vacuum formed, sufficient thinness and pliability for close conformation to the surface contours of the figures to be reproduced so as to retain fine details thereof, sufficient thickness and rigidity to support casting material and sufficient flexibility to be peelable from a partially set product.

BRIEF DESCRIPTION OF THE DRAWINGS

FIG. 1 is a perspective view of apparatus used to prepare a mold of the present invention, during a claying-up step;

FIG. 2 is a perspective view of additional apparatus used during preparation of a mold of the present invention;

FIG. 3 is a perspective view of a mold prepared in accordance with the present invention;

FIG. 4 is a plan view of one mold half during use thereof;

DETAILED DESCRIPTION

Figure 5:
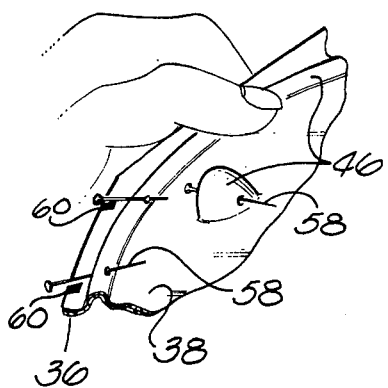
FIG. 5 is a perspective view of a portion of the mold of FIG. 3 illustrating securement thereof.

The sculpture illustrated in the drawing is the figure of a boy running with a kite, but it will be appreciated that the process described herein is applicable to a wide variety of shapes. Preferably, for simplicity of mold preparation, the figure to be cast is designed so that the limbs extend basically in one plane.

Referring to FIG. 1, as an initial step in preparation of the present mold, an investment casting 10, e.g., in bronze, is made from a wax sculpture to be reproduced. The investment casting is cleaned up and further detailed as desired and a mounting rod 12 is secured to the bottom of one leg of the casting 10. The casting 10 is approximately 4-½ inches from foot to head, about 3-½ inches across the arms and its greatest depth dimension is about 2 inches.

A parting line 14 is drawn on the casting 10 so as to divide it into approximately equal halves. The casting 10 is then placed in a mold box, constructed of slats 16, each slat about 6 inches long and 1-¼ inches wide and is clayed-up by application of very fine modeling clay 18. The clay 18 is added only to the parting line 14 so that the facing half of the casting 10 protrudes as shown in FIG. 1. At this point, various surface features are added to the marginal regions 20 of the clay 18, i.e., those surface regions of the clay 18 extending outwardly from the parting line 14. Dimples 22, one or more grooves 24, and other depressions as desired, are made into the marginal regions 20, and protuberances such as cones 26 and one or more ribs or elongated ridges 28 are added to the surface of the marginal regions 20. Such features serve to form conjugate protuberances in the final mold structure as will be described in more detail hereinafter. The cones 26 can conveniently be of aluminum, each with a mounting pin depending from its base for insertion into the clay 18 surface. The ridge 28 can be formed of a length of rolled clay added to the clay 18 surface. Other added features can include indicia plates containing part identification, trim lines and pinning spots (for purposes to be described hereinafter). Additionally, a funnel-shaped aluminum member 30 is embedded half-way into the clay 18 so as to abut the top of the casting 10.

After claying-up is completed, the slats 16 are removed and replaced by a set of slats (shown in shadow at 32) of the same length but 2-½ inches wide. A first master mold half 34 (FIG. 2) is then cast from the clay-up, in any known manner, e.g., using polysulfone rubber. Following setting of the first mold half 34, the clay 18, metal cones 26 and indicia plate are removed therefrom, but the bronze casting 10 and funnel-shaped member 30 are retained. As shown in FIG. 2, the first master mold half 34 is then placed inverted in the mold box defined by the wide slats 32 and its exposed surface is coated with several coats of a silicone mold release compound in white shellac, as known. A second master mold half is then cast from the first master mold half (with casting 10 and funnel-shaped member 30 in place) with polysulfone rubber. Thereafter, the first and second master mold halves are placed side-by-side in a mold box and, using epoxy, a rigid tool member is then cast therefrom.

Referring to FIG. 3, a flat sheet of rigid polyvinyl chloride film, having a thickness of 0.010 inch (but which may be in the range $0.010 \pm 0.003$ inch), is vacuum formed, by known techniques, against the above-referred-to-tool surface. Such film is sufficiently thin for ease of penetration of pins therethrough (as will be described), is readily vacuum formed, is sufficiently thin for close conformation to the surface contours of the figures to be reproduced so as to retain fine details thereof, is sufficiently thick and rigid to support casting material and is sufficiently flexible to be peelable from a partially set product as will be described. The film is clear and unplasticized and can be characterized physically as having a specific gravity (density) of 1.2–1.5, a tensile strength of 5000–10000 p.s.i. and an elongation of 2–50%, and electrically, a volume resistivity of at least $10^{16}$ and a dielectric constant ($10^3$ cps) of 3.0–3.3.

The rigid polyvinyl chloride film is deformed to conform to the contours of the tool surface yielding a pair of mold halves 36 and 38 joined and foldable along a line of weakness 40. The mold halves 36 and 38 mate along a parting line 14a to define a mold chamber 42 in the shape of the casting 10 to be replicated, an access funnel opening 44 to the chamber 42 in the shape of the funnel member 30, and marginal regions 20a and 20b coextensive about the chamber 42 from the parting line 14a. The marginal regions 20a and 20b are formed with conjugate protuberances 46 which coact to align and secure the mold halves 36 and 38. The protuberances 46 are formed from the dimples 22, grooves 24, cones 26 and elongate ridges 28 referred to in FIG, 1 and include elongate formations 46a arranged tandemly about the chamber 42 and a plurality of conical formations 46b between the chamber 42 and elongate formations 46a. The direction of the protuberances 46, whether concave or convex in FIG. 3, is determined by the use of dimples 22 or cones 26 or by grooves 24 or ridges 28 in the clay-up of FIG. 1, and are chosen to most readily facilitate pinning as will be described.

Referring to FIG. 4, each mold half is cut with a scissors along trim lines 48 and the top of the access funnel 44 is cut open. A length of thick but bendable wire 50, e.g. 18 gauge, is bent to shape and placed in the chamber 42, bridging across the arms thereof. An additional length of bendable wire 52, integral with an elongate mounting rod 54 is twisted to form a loop 56 and otherwise contoured to lie in the chamber 42, bridging lengthwise thereof. Connection between the rod 54 and wire 52 is obtained by drilling a hole into one end of the rod 54, dipping the wire 52 in flux, placing the flux-coated wire 52 in the hole, heating the assembly to 400°–450°F and applying solder to the connection. The wire segments 50 and 52 serve to provide strength to the thinner regions of the cast product. The mounting rod 54 is placed in an elongate cavity 57 of the chamber 42 corresponding in shape to the mounting rod 12 referred to respecting FIG. 1.

Figure 6:
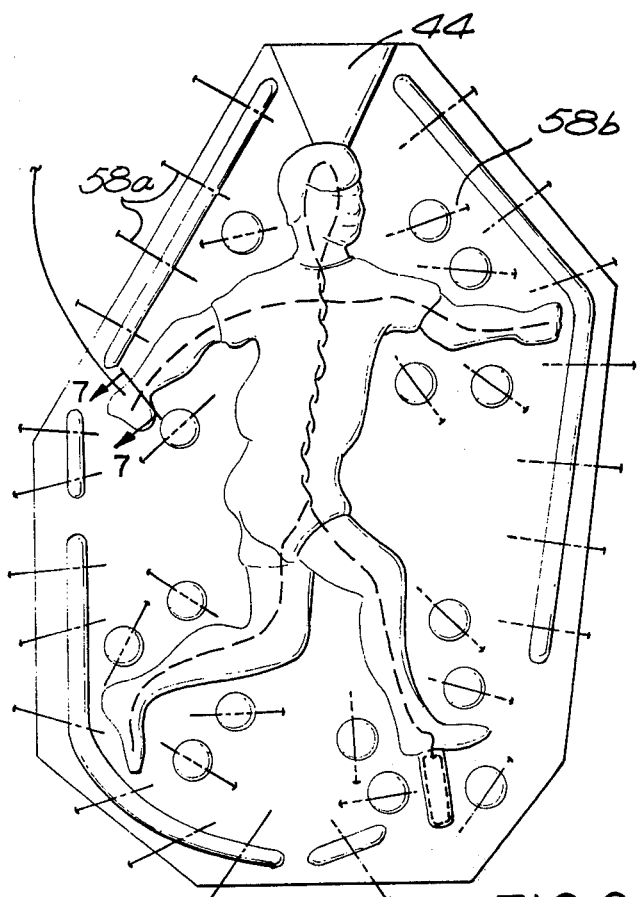
FIG. 6 is a plan view of a secured mold.

Referring to FIGS. 5 and 6, the two mold halves 36 and 38 are aligned and secured together by pinching the mold as shown and inserting straight pins 58 crosswise through the protuberances 46 close to the bases thereof. A series of pinning spots 60 indented into the mold halves adjacent the elongate formations 46 aid in locating the pins 58 therealong. As shown in FIG. 6, some of the pins 58a are inserted on one side of the mold assembly while other pins, shown in shadow at 58b, are inserted on the opposite side, depending upon access permitted by surface contours of the mold 36-38.

Figure 7:
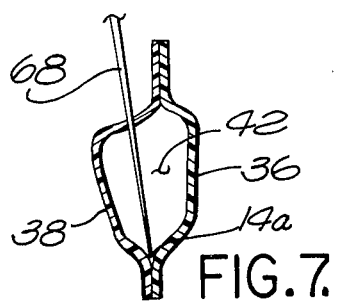
FIG. 7 is a cross-sectional view taken on line 7-7 of FIG. 6, in the direction of the arrows.

Referring additionally to FIG. 7, wire 68 for supporting of a "kite" (See FIG. 10) is inserted through the top mold half 38 only, at the center of the figure's right hand. The wire 68 is pressed through just far enough so that the parting line 14a seam between the mold halves 36 and 38 hold the wire centered in the mold as shown.

Figure 8:
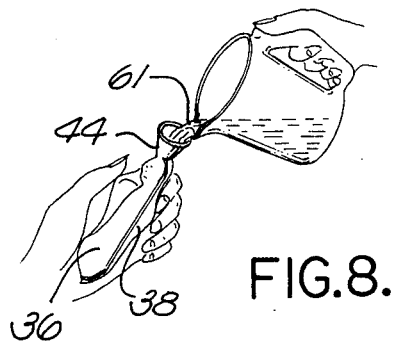
FIG. 8 is a perspective view of a step in preparation of a decorative structure using the mold herein.

Referring to FIG. 8, the mold 36–38 is held upright and tipped backward at a slight angle. A stream of casting material 61 is then poured into the mold through the funnel opening 44, until the mold chamber is filled and the funnel opening 44 is half filled. A toothpick or piece of wire can be inserted through the funnel opening 44 and "pumped" to work out any air bubbles trapped in the head of the figure. The filled mold 36–38 is then set aside for several hours permitting the casting material to set to a self-supporting consistency, about 2 hours being sufficient.

As casting material, one can use any cementitious material which will set without substantial heating to a self-supporting consistency and which can be baked to a rigid, hard consistency. A variety of such materials are well known, such as plaster of Paris, gypsum, art plaster, casting plaster and other spackling and/or patching materials, but a particularly effective material has the dry formula:

| Component | Parts by Weight |
| --- | --- |
| High strength gypsum cement | 91.8 |
| Polyvinyl acetate | $8.0 \pm 1.0$ |
| Pigment | $0.20 \pm 0.05$ |

100 parts by weight of the above dry mixture are added to $36 \pm 2$ parts by weight of water and thoroughly stirred to a thick syrupy consistency. Inferior castings are obtained when an amount of water below or above this range is used; therefore, a measuring cup is conveniently provided in the kit.

A number of high strength gypsum cements are commercially available and are generally blends having average compressive strengths of at least 10,000 pounds per square inch dry. A particularly suitable gypsum cement is an alkaline cement having a normal consistency (parts of water to 100 parts cement, by weight to make a pourable slurry) of 28–40, a setting range of 17–26 minutes, a typical setting expansion of 0.002 inch per inch, a dry density of about 105 pounds per cubic foot and an average compressive strength of about 10,000-11,000 pounds per square inch dry. Such material can be obtained commerically under the trade name "HYDRO-STONE" from United States Gypsum Company.

The polyvinyl acetate adds impact and tensile strengths to the gypsum cement. It is in powder form and is preferably redispersible, e.g., such as described in U.S. Pat. No. 2,800,463 and obtainable under the trademark "GELVA Powder 702" from Monsanto. The pigment is added to impart a desired color to the casting. A particularly useful pigment is phthalocyanine organic pigment as manufactured by E. I. DuPont (NO. 3820 Zulu Green, sold by Harshaw Chemical Company). In the amount given above, this pigment imparts a green color to the casting which greatly resembles the patina found on oxidized bronze statuary.

Figure 9:
FIG. 9 is a perspective view of an additional step during preparation of decorative structure in accordance herewith.

After the casting has set to a self-supporting consistency, the pins 59 are carefully removed. Starting with the mold corners, the two mold halves 36 and 38 are carefully pulled apart around the edges and then from the casting. Referring to FIG. 9, holding the casting 62 by the head, the funnel portions 64 of the casting can be twisted off, as shown by the arrow 66. The casting is then "cleaned" with a knife to remove molding seams and any holes or voids are patched with a small amount of casting material. At this point, one can individually style the casting 62. Extra detailing can be added by use of a sharp knife or razor blade or, if one desires a primitive or rough styling, a small pallette knife or similar tool can be used to "butter" casting material onto the figure. Alternatively, modern, impressionistic styling can be achieved by smoothing protruding details and filling deep details. Fine sanding and a covering coat of white glue can enhance such effect.

Figure 10:
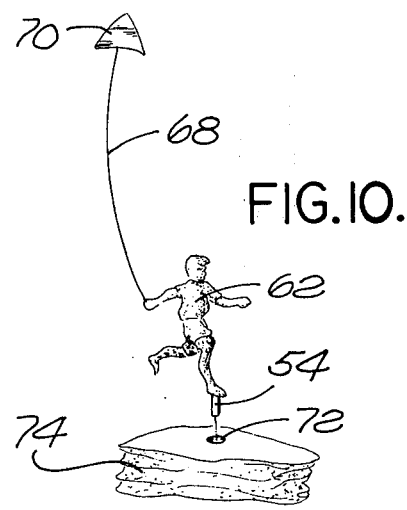
FIG. 10 is a perspective view of a decorative structure prepared in accordance herewith.

After permitting any added casting material to set (about 1 hour), the casting 62 is placed in an oven and heated from room temperature to about 200°F and baked at that temperature for about 4 hours. The oven is then allowed to cool for about 20 minutes whereupon the hardened casting 62 is removed. Thereafter, a number of decorative steps can be taken to finish the figure. One can simulate a bronze reproduction by applying tarnish (dark) metal finish followed by bright metal finish. The tarnish finish should be applied over 70-90% of the figure, depending upon how much exposed green "patina" is desired. Bright metal finish should then be applied to about 20-40% of the figure, covering highlight areas, to simulate the buffed highlights of a bronze figure. Tarnish and metal finish are available, as dispersions of powdered metal in wax, for example, from Rub 'n Buff, division of American Art Clay, Indianapolis, Indiana. Referring to FIG. 10, as a decorative touch, as above-referred to, in this particular figure, the length of rigid wire 68 can be used to support a "kite" 70, and the casting can be inserted by its projecting mounting rod 54 into a hole 72 formed in a simulated rock base 74. The "kite" 70 can be formed as a cardboard cut-out, covered with a thin layer of the casting compound and finished with the tarnish and metal waxes. Other decorative steps may be taken. For example, if a modernistic style has been chosen, it may be desirable to cover the entire patina color of the cast figure with metallizing compound.

I Claim:

1. A mold for cast-reproduction of a three dimensional structure, comprising a pair of mold halves, each half formed of rigid polyvinyl chloride film having a thickness of 0.010 ± 0.003 inch and deformed in conformation to opposite surface contours of said structure, said halves mating along a parting line to define a mold chamber, an access opening to said chamber, and marginal regions coextending about said chamber from said parting line, said marginal regions being formed with a plurality of conjugate elongate protuberance pairs arranged tandemly substantially around said mold chamber and a plurality of conjugate conical protuberance pairs arranged between said chamber and said elongate protuberance pairs, each component of said conjugate protuberance pairs extending a substantial distance beyond said parting line a pin disposed crosswise directly through each of said protuberance pairs for securement of said mold.

* * * * *